(12) United States Patent
Moberg

(10) Patent No.: US 8,366,186 B2
(45) Date of Patent: Feb. 5, 2013

(54) HEADLINER COMPRESSION STIFFENER

(75) Inventor: Joshua Lewis Moberg, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 298 days.

(21) Appl. No.: 12/783,031

(22) Filed: May 19, 2010

(65) Prior Publication Data

US 2011/0285179 A1 Nov. 24, 2011

(51) Int. Cl.
*B60R 13/02* (2006.01)

(52) U.S. Cl. .................................................. 296/214

(58) Field of Classification Search ................ 296/214
See application file for complete search history.

(56) References Cited

U.S. PATENT DOCUMENTS

| | | | |
|---|---|---|---|
| 3,953,067 A | 4/1976 | Isola | |
| 4,883,312 A * | 11/1989 | Kulis | 296/214 |
| 4,886,696 A | 12/1989 | Bainbridge | |
| 5,509,247 A * | 4/1996 | Fortez et al. | 52/630 |
| 5,833,304 A * | 11/1998 | Daniel et al. | 296/214 |
| 7,384,095 B2 | 6/2008 | Cormier et al. | |
| 7,513,566 B2 | 4/2009 | Ludwig | |
| 2005/0040679 A1 | 2/2005 | Lipke et al. | |
| 2006/0103172 A1 | 5/2006 | Veen et al. | |

* cited by examiner

*Primary Examiner* — Joseph Pape
(74) *Attorney, Agent, or Firm* — Gifford, Krass, Sprinkle, Anderson & Citkowski, P.C.

(57) ABSTRACT

The present invention provides for a vehicle headliner having localized compressed stiffeners to increase rigidity and decrease brittleness. The headliner compression stiffener adds rigidity to the headliner substrate without adding additional cost or additional weight. At least one compression stiffener is added to a vehicle headliner to an area of the vehicle headliner requiring increased rigidity qualities. The stiffener is an elongated indentation formed by firmly compressing an object into the substrate of a headliner. The substrate of the vehicle headliner includes a first predetermined density in areas where the stiffener is not located. A second density is localized in the headliner substrate in the area directly below the indentation of the stiffener. The predetermined first density is lower in measurement than the second density of the substrate directly below the indentation of the stiffener. By increasing density in the area directly below the stiffener indentations, the headliner as a whole is stronger in areas near the stiffener indentations without increasing weight or substantially increasing cost.

14 Claims, 1 Drawing Sheet

HEADLINER COMPRESSION STIFFENER

FIELD OF THE INVENTION

This invention relates generally to a vehicle headliner. Specifically, this invention relates to a vehicle headliner having a compression stiffener indentation to increase rigidity and decrease brittleness.

BACKGROUND OF THE INVENTION

It is desirable to produce a vehicle headliner formed of a one-piece construction to permit more efficient production. Automotive vehicle headliners line the interior roof of a vehicle to produce a soft-to-touch panel and to improve aesthetics. Vehicle headliners are typically comprised of a substrate such as fiberglass. However, vehicle headliners often lack the rigidity required by design standards. The lack of strength and rigidity can prevent successfully installing modular components in the vehicle headliner. To combat said lack of rigidity, additional layers of material are added to the vehicle headliner in areas of low rigidity. Adding additional material increases weight and increases cost of the vehicle. Accordingly, it is desirable to produce a low cost and low weight alternative for increasing rigidity and decreasing brittleness of a vehicle headliner.

SUMMARY OF THE INVENTION

The present invention provides for a vehicle headliner having localized compressed stiffeners to increase rigidity and decrease brittleness. The headliner compression stiffener adds rigidity to the headliner substrate without adding additional cost or additional weight. At least one compression stiffener is added to a vehicle headliner to an area of the vehicle headliner requiring increased rigidity qualities. The stiffener is an elongated indentation formed by firmly compressing an object into the substrate of a headliner. The substrate of the vehicle headliner includes a first predetermined density in areas where the stiffener indentation is not located. A second density is localized in the headliner substrate in the area directly below the indentation of the stiffener. The predetermined first density is lower in measurement than the second density of the substrate directly below the indentation of the stiffener. By increasing density in the area directly below the stiffener indentations, the headliner as a whole is stronger in areas near the stiffener indentations without increasing weight or substantially increasing cost.

BRIEF DESCRIPTION OF THE DRAWINGS

The above and other features and objects of the invention will be better understood from the following detailed description of the typical embodiments illustrated in the accompanying drawings, in which.

DETAILED DESCRIPTION OF THE PREFERRED EMBODIMENTS

A headliner is provided having a plurality of stiffener indentations to improve rigidity qualities and to decrease brittleness of a vehicle headliner. The stiffener indentations are elongated and positioned at various locations on a vehicle headliner requiring improved rigidity in that location on the vehicle headliner. The stiffener indentations increase rigidity by providing for areas having a higher density.

Figure 1:
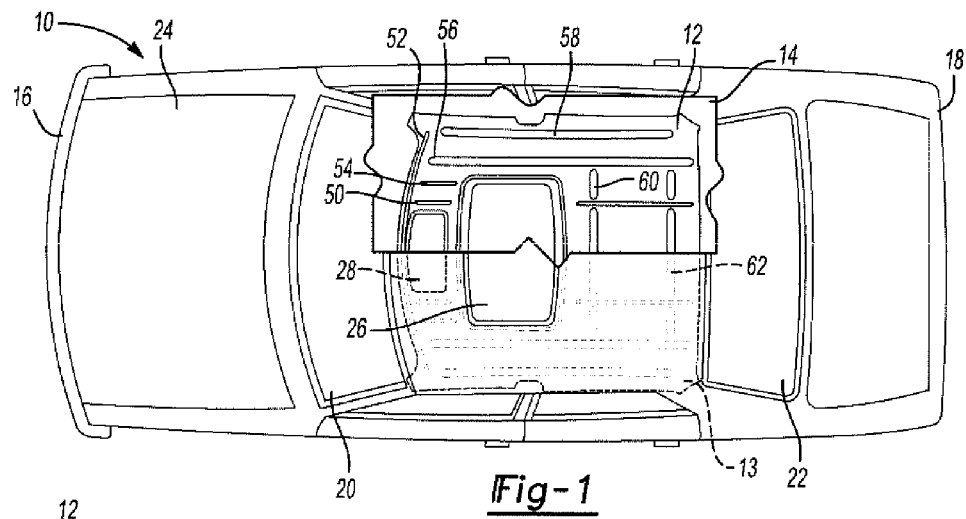
FIG. 1 is a top view of an automotive vehicle having a cutout portion illustrating various locations for a stiffener indentation.
Figure 2:
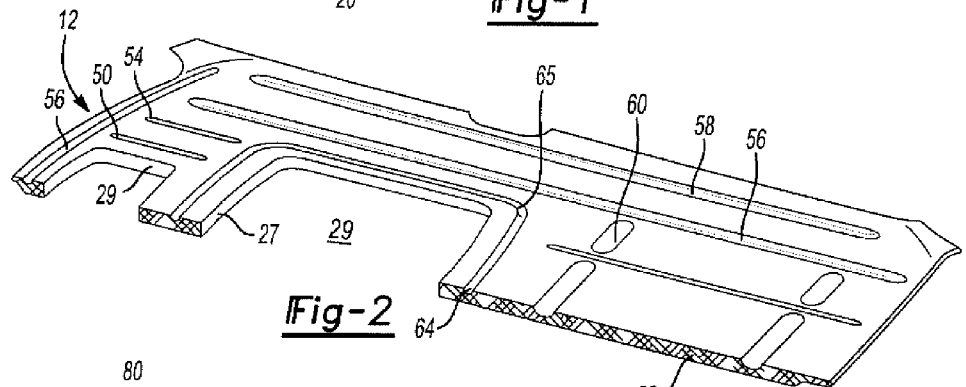
FIG. 2 is a perspective view of a section of a headliner having a plurality of stiffener indentations.

Now referring to FIGS. 1-2, a vehicle 10 is provided having a front end 16 and a rear end 18. The vehicle 10 further includes a vehicle hood 24, a windshield 20, and a rear window 22. The vehicle 10 further includes a headliner 12 positioned on a roof 13 of the vehicle 10. The roof 13 includes an aperture 29 having a sunroof 26 attached thereto wherein the roof 13 includes areas of decreased rigidity. The roof 13 further includes a modular component 28 providing interior lighting, storage, or other interior accessory. Modular component 28 further includes areas of decreased rigidity in the surrounding headliner 12.

The headliner 12 further includes a plurality of stiffener indentations 50, 52, 54, 56, 58 and 60. Stiffener indentation 50 on the headliner 12 is provided adjacent to the modular component 28 to increase rigidity of the headliner 12 and the surrounding area of the modular component 28. Furthermore, stiffener indentation 52 is provided on the front end of the headliner 12 to increase rigidity of the headliner 12 in the area surrounding the visors (not pictured). Magnification cutout section 14 better shows the positioning of stiffener indentations 50, 52, 54, 56, 58 and 60. FIG. 1 further provides stiffener indentation 62 in outline form on the vehicle headliner 12.

Stiffener indentation 64 is provided on the headliner 12 to increase rigidity in the area around the sunroof 26. The stiffener indentation 64 provides for a curved section 65 to increase rigidity around the corners of the installed sunroof 26 on the vehicle headliner 12.

Figure 3:
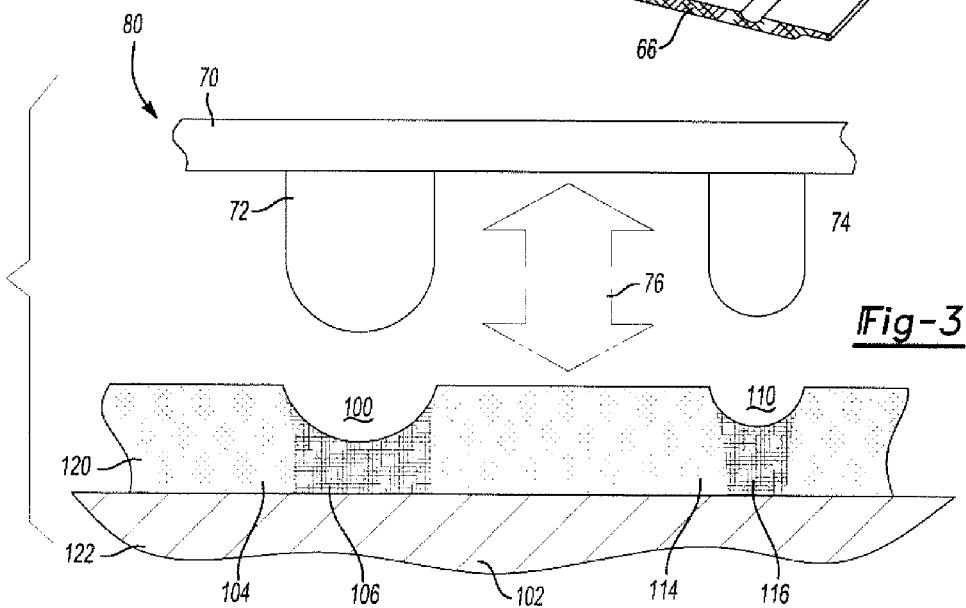
FIG. 3 is a cross-sectional view of a headliner having stiffener indentations.

The vehicle headliner 12 is comprised of fiberglass, plastic, or other composite substrate. In this embodiment, the headliner 12 substrate is comprised of two layers. A first layer 120 is made of fiberglass and a second layer 122 is a cloth, or cloth-like, material, as shown in FIG. 3. First layer 120 is made of fiberglass and the stiffener indentations 50, 52 are formed therein. The first layer 122 is the layer which is seen by the occupant of the vehicle 10. The occupant of the vehicle 10 does not see the stiffener indentations 100, 110 formed within the substrate second layer 120.

As shown by FIG. 3, stiffener indentations 100, 110 are formed within the substrate first layer 120. The stiffener indentation 100 is larger than the stiffener indentation 110. The stiffener indentations may have various dimensions including varying lengths, various radiuses, and different depths. The stiffener indentations may be elongated, for example stiffener indentations 56, 58. The stiffener indentations may be short and wider, as shown by stiffener indentation 60. There is no limit as to the length, width, curvature, radius, or depth of the above mentioned stiffener indentations.

As shown by FIG. 3, stiffener indentations 100, 110 are formed by means of a tool 80 having rounded protrusions 72, 74. Protrusions 72, 74 are elongated to form the elongated stiffener indentations 100, 110. The tool 80 compresses the substrate first layer 120 to form the stiffener indentations 100, 110.

Stiffener indentation 100 acquires increased rigidity by means of varying densities on the headliner 12. The first layer 120 includes a first predetermined density 104 in the area of the first layer 120 directly adjacent to the stiffener indentation 100. Stiffener indentation 100 further includes a second density 106 provided directly below the stiffener indentation 100. The second density 106 is significantly higher than the first predetermined density 104 positioned directly adjacent to the stiffener indentation 100. The second density 106 disposed directly under stiffener indentation 100 sufficiently increases the overall rigidity of the headliner 12.

Stiffener indentation 110 acquires increased rigidity by means of varying densities on the headliner 12. The first layer 120 includes a first predetermined density 114 in the area of the first layer 120 directly adjacent to the stiffener indentation 110. Stiffener indentation 110 further includes a second density 116 provided directly below the stiffener indentation 110. The second density 116 is significantly higher than the first predetermined density 114 positioned directly adjacent to the stiffener indentation 110. The second density 116 disposed directly under stiffener indentation 110 sufficiently increases the overall rigidity of the headliner 12.

It is also to be understood that, although the foregoing description and drawings describe and illustrate in detail working embodiments of the present invention, to those skilled in the art to which the present invention relates, the present disclosure will suggest many modifications and embodiments. The present invention, therefore, is intended to be limited only by the scope of the appended claims and the applicable prior art.

I claim:

1. A one-piece construction headliner panel for lining the interior of an automotive roof having areas of low rigidity, the headliner supporting an accessory, the headliner panel comprising:
    a substrate having a first predetermined density, the substrate having at least one aperture for mounting the accessory, the aperture having a peripheral edge; and
    at least one localized compressed indentation, the compressed indentation formed in the substrate, the compressed indentation positioned adjacent the peripheral edge of the aperture, the compressed indentation spaced outwardly from the peripheral edge of the aperture, substrate having the first predetermined density separating the localized indentation from the aperture, the substrate of the compressed indentation having a second predetermined density;
    wherein the second predetermined density of the compressed indentation is greater than the first predetermined density of the substrate operable to increase the rigidity and strength of the headliner on a localized portion of the headliner to support an accessory mounted in the aperture.

2. The headliner panel for the automotive roof of claim 1, wherein the at least one compressed indentation is elongated.

3. The headliner panel for the automotive roof of claim 2, wherein the at least one compressed indentation has a predetermined width.

4. The headliner panel for the automotive roof of claim 3, wherein the predetermined width of the at least one compressed indentation is 1-60 millimeters.

5. The headliner panel for the automotive roof of claim 2, wherein the at least one compressed indentation has a predetermined length.

6. The headliner panel for the automotive roof of claim 5, wherein the predetermined length of the at least one compressed indentation is 10-2000 millimeters.

7. The headliner panel for the automotive roof of claim 1, wherein the at least one compressed indentation is generally circular, the compressed indentation further having a diameter.

8. The headliner panel for the automotive roof of claim 2, wherein the at least one compressed indentation has a first cross-section.

9. The headliner panel for the automotive roof of claim 8, wherein the cross-section of the at least one compressed indentation is semi-circular.

10. The headliner panel for the automotive roof of claim 8, wherein the cross-section of the at least one compressed indentation is generally rectangular.

11. The headliner panel for the automotive roof of claim 8, wherein the cross-section of the at least one compressed indentation has a radius.

12. The headliner panel for the automotive roof of claim 1, wherein the second predetermined density is measured at a highest density area within the indentation.

13. The headliner panel for the automotive roof of claim 1, wherein the substrate is planar.

14. The headliner panel for the automotive roof of claim 1, wherein the substrate is fiberglass.

* * * * *